2,938,059
CATALYTIC METHOD FOR OBTAINING PENTACHLOROPHENOL FROM PHENOL

Wlodzimierz Rodziewicz, 28 Wroblewskiego St., Gdansk-Wrzeszcz, Poland, Jan Dobrowolski, 7 H. Sawickiej St., Gdansk-Wrzeszcz, Poland, and Wieslaw Wojnowski, 123 Robotniczej St., Gdansk-Jednosci, Poland No Drawing. Filed Feb. 21, 1958, Ser. No. 716,566
Claims priority, application Poland Mar. 27, 1957
1 Claim. (Cl. 260—623)

Pentachlorophenol, $C_6Cl_5OH$, is a fungicide and insecticide compound. It is at the same time an excellent medium used for wood preservation as well as in the wood industry on a large scale. It has found many various applications in different branches of the food and pharmaceutical industry, it is used for example in streptomycin purification.

The direct chlorination of phenol, no catalysts being used, leads chiefly to place three atoms of chlorine in a single phenol molecule. In order to obtain tetrachlorophenol it has heretofore been necessary to chlorinate the phenol during a long period of time, for instance 14 days. This reaction takes place more rapidly when using catalysts, like: antimonous trichloride, iodine, ferric chloride. It has been impossible however to obtain pentachlorophenol by means of direct chlorination, without using any catalyst.

The chemical literature discloses different methods for obtaining pentachlorophenol by using as catalysts: antimonous chloride, iron, aluminium trichloride, stannous chloride and cuprous chloride in quantities above 10%, with simultaneous heating of the employed substances. As a rule a long time has been required to perform these reactions and only a small quantity of the main product has been obtained.

In 1954 a new method for producing pentachlorophenol by means of hydrolysis of hexachlorobenzene was patented. See United States Patent No. 2,692,899, granted October 26, 1954, to Alfred J. Kolka. This method however requires the use of benzene as a starting material as well as an expensive glycol to complete the hydrolysis of hexachlorobenzene. Sulphur, selenium and tellurium are used as catalysts in this process.

During our research on organic silicon compounds, prepared by use of chlorine derivatives of phenol, we found that the presence of small amounts of tellurium unexpectedly catalyze the chlorination process and facilitate the production of pentachlorophenol by direct chlorination of phenol at a higher temperature.

The production of pentachlorophenol is based on the chlorination of phenol at a temperature between 65° and 200° C. in the presence of properly prepared tellurium and its compounds as chlorination catalysts. The process consists in a successive replacement of five hydrogen atoms combined with the five carbon atoms of the benzene ring by five chlorine atoms.

When chlorinating phenol, a catalyst may be added at the beginning of the reaction, subsequently chlorine is introduced till a convenient increase of sample weight is obtained which means that five atoms of chlorine have replaced five atoms of hydrogen in a single phenol molecule. Phenol may also be first chlorinated without any catalyst till the increase of the weight of the sample corresponds to the introduction of three chlorine atoms into a single phenol molecule. The catalyst is added thereupon and the chlorination continues till the increase in the weight of the sample proves the introduction of five chlorine atoms into a single phenol molecule.

In both the above described methods of phenol chlorination a certain amount of tetrachlorophenol and of compounds insoluble in sodium- and potassium-hydroxide are obtained as side-products. But the first method described allows to obtain the pentachlorophenol during a shorter period of time.

Example No. 1

A sample of 50 g. of phenol was chlorinated at a moderate flow of chlorine in the presence of tellurium or its compound as a catalyst in an amount about 1% of the weight of the phenol used. After 12 hours of the chlorination the increase of the weight of this sample corresponded to the introduction of five chlorine atoms into a single phenol molecule. At the beginning of the reaction the temperature was kept in the interval between 65°–100° C. but at the end of this reaction it was successively raised till 180° C. The average yield of pentachlorophenol was 70% of the theoretical one.

Example No. 2

One sample of 50 g. of phenol was chlorinated at a moderate flow of chlorine without any catalyst till the increase of the weight of the sample was correspondent to the introduction of three chlorine atoms into a single phenol molecule. Then 1% of the phenol weight of tellurium or its compounds was added as catalyst and the chlorination continued till the increase of the weight of the sample corresponded to the introduction of five chlorine atoms into a single phenol molecule, which was obtained after about 20 hours since the beginning of chlorination. The temperature during the first stage of this reaction was kept in a range between 65°–100° C. and then it was successively raised to between 190° and 200° C. The yield of this process has been 70% of the theoretical one like in the Example No. 1.

The separation of pentachlorophenol presents no difficulties. It may be carried out by common chemical means. The raw pentachlorophenol is dissolved in 10% sodium or potassium hydroxide and filtered from the insoluble residue. Then the solution is treated with hydrochloric acid or with carbon dioxide gas. The obtained white sediment is thereupon filtered, washed, dried and crystallized from an organic solvent. In the industrial practice the method of using carbon dioxide for saturation of the alkali solution should be preferable, since it does not require the use of the more expensive hydrochloric acid, and sodium or potassium hydroxides may be then regenerated by caustification of the carbonates obtained by the action of carbon dioxide on the corresponding hydroxides.

For many technical purposes the purification of raw pentachlorophenol may not be necessary at all, since the product can be used as such as wood-preservative, fungicide and insecticide.

We claim:

A method of obtaining pentachlorophenol which comprises the steps of chlorinating phenol at a temperature of between 65° and 200° centigrade, and adding tellurium to the reaction medium as a catalyst.

References Cited in the file of this patent
UNITED STATES PATENTS
2,131,259 Stoesser _____ Sept. 27, 1938

UNITED STATES PATENT OFFICE

CERTIFICATE OF CORRECTION

Patent No. 2,938,059                          May 24, 1960

Wlodzimierz Rodziewicz et al.

It is hereby certified that error appears in the above numbered patent requiring correction and that the said Letters Patent should read as corrected below.

In the grant, line 3, for "Wieslaw Wojnowski, of Gdansk-Jednosci, Poland," read -- Wieslaw Wojnowski, of Gdansk, Poland, --; in the heading to the printed specification, lines 6 and 7, for "Wieslaw Wojnowski, 123 Robotniczej St., Gdansk-Jednosci, Poland" read -- Wieslaw Wojnowski, 123 Jednosci Robotniczej St., Gdansk, Poland --.

Signed and sealed this 15th day of November 1960.

(SEAL)
Attest:

KARL H. AXLINE

Attesting Officer

ROBERT C. WATSON
Commissioner of Patents